3,009,963
PRODUCTION OF AROMATICALLY SUBSTITUTED
CARBINOLS
Heinrich Hock and Heinz Kropf, Harz, Germany, assignors to Ruhrchemie, Aktiengesellschaft, Oberhausen-Holten, Germany, a corporation of Germany
No Drawing. Filed Jan. 5, 1959, Ser. No. 784,883
Claims priority, application Germany Aug. 5, 1955
6 Claims. (Cl. 260—618)

This invention relates to new and useful improvements in the production of tertiary carbinols.

More specifically this invention relates to a process involving the decomposition of tertiary organic hydroperoxides to the corresponding tertiary carbinols. It is well known in the art that the thermal decomposition of tertiary organic hydroperoxides results in a variety of products, among which are the corresponding ketones and tertiary carbinols. For instance thermal decomposition of cumene hydroperoxide results in the production of aceteophenone, dimethyl phenyl carbinol, $\alpha$-methyl styrene, dicumene peroxide and dicumene. Fractionation of the reaction products is obviously time-consuming and expensive. None of the processes heretofore disclosed have been sucessful in effecting substantial yields of the tertiary carbinols from the tertiary hydroperoxides.

Resort has been had, consequently, to other more complex reaction schemes; for instance, in order to prepare tetralol in good yield, the hydroperoxide of tetralin has been treated with alkali to give a mixture of tetralone and tetralol, which is then subjected to catalytic hydrogenation.

One object of this invention is the thermal decomposition of tertiary organic hydroperoxides in one step with the production of high yields of the corresponding carbinols. Another object of the invention is the production of the tertiary carbinols in a state of very high purity. This and still further objects will become apparent from the following description.

According to this invention, very high yields of tertiary carbinols of the general formula:

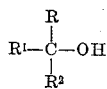

wherein R is aryl, or substituted aryl, or a napthyl group, $R^1$ is an aliphatic alkyl group containing up to 6 carbon atoms, and $R^2$ may be identical to either R or $R^1$ or may be different, may be obtained by treating the corresponding hydroperoxide

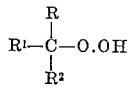

with a concentrated aqueous solution of an alkaline reagent, under such conditions that the medium is always maintained definitely alkaline, and the concentration of the hydroperoxide in the reaction medium is kept at a minimum. This is achieved by dropwise addition of the hydroperoxide to about 0.5 to 2 mols of a metal base in the form of a 10–70% aqueous solution, preferably 25–50%, at a rate ranging between 0.1–2 mols of hydroperoxide per mol of the metal base per hour.

In view of the fact that the base is used up during the reaction only to neutralize whatever free carboxylic acid by-product is formed, the pH of the solution remains substantially constant, and always above 11.

Obviously the rate of addition of the hydroperoxide to the basic solution requires more careful control in the first stage than in the later stage, because, as the reaction proceeds, more hydroperoxide is converted to the tertiary carbinol, and the danger of accumulating the unreacted hydroperoxide in the reaction mixture is minimized.

In view of the fact that strong alkaline conditions are advantageous to the reaction, potassium hydroxide and sodium hydroxide are very suitable. However, lithium hydroxide, barium hydroxide and calcium hydroxide may also be used.

According to the preferred embodiment of this invention, the hydroperoxide is added to about equal parts of a 25% sodium hydroxide solution, previously heated to 50°–150° C., and preferably 105°–110°, at a rate between 0.5 and 1 mol of hydroperoxide per mol of sodium hydroxide per hour. A preheating step is advantageous, because it allows for more rapid decomposition and practical minimization of the formation of by-products.

Examples of the tertiary organic hydroperoxides which may be used according to the invention include cumene hydroperoxide and p-cymene hydroperoxide. The hydroperoxides of p-diisopropyl benzene, isopropyl naphthalene, 2-phenyl-butane and 1.1-diphenyl ethane may also be used as the starting material according to the invention.

The process of this invenaion may be carried out either using the purified hydroperoxide as a starting material, or a mixture of the pure hydroperoxide with pure corresponding hydrocarbon, or it may be carried out using a paritially oxidized hydrocarbon rich in hydroperoxides.

The carbinols obtained by the decomposition in accordance with the invention have a purity of at least 90% and are contaminated with only small amounts of ketones and carboxylic acids formed as by-products during the reaction. These by-products, and particularly the acid, are capable of being very easily separated from the reaction mixture. For example, in the thermal decomposition of cumene hydroperoxide, in accordance with the invention, in addition to the formation of dimethylphenyl carbinol, acetophenone and benzoic acid are formed as by-products, and may be removed by the methods well known in the art.

It has been found particularly advantageous to effect the decomposition in the presence of hydrocarbon which corresponds to the hydroperoxide since part of the same is converted into the desired carbinol and thus it is possible to get actual yields which exceed 100% of the theoretical yield based on the hydroperoxide. Thus, for example, it is preferable to effect the thermal decomposition of the cumene hydroperoxide in the presence of cumene.

The proportion of the hydroperoxide to the hydrocarbon may vary over a wide range; for instance one may use an excess of the hydrocarbon, up to 5 parts of the hydrocarbon for each part by weight of the hydroperoxide, or one may use an excess of the hydroperoxide over the hydrocarbon.

The advantages residing in the use of the hydrocarbon are due not only to the fact that it participates to the reaction allowing for better yields, but also that it acts as a diluent, and prevents local overheating which might occur during the decomposition of the hydroperoxide, with subsequent increase of the undesirable products.

The reaction mechanism, in accordance with the invention, is believed to differ substantially from an ordinary thermal decomposition or decomposition catalyzed by heavy metals because while the latter involves a free radical reaction mechanism, the reaction in accordance with this invention, probably proceeds by an ionic mechanism.

This application is a continuation in part of Serial No. 602,405 filed August 6, 1956, and now abandoned.

*Example 1*

50 grams of cumene hydroperoxide were allowed to drop slowly into a mixture of 86 grams of cumene and 52.7 grams of 25% sodium hydroxide solution, keeping the temperature during the addition at 105° C. The addition required about 2 hours. Upon completion of the decomposition of the hydroperoxide, the lye was drawn off. It contained 1.1 grams of benzoic acid. The hydrocarbon was separated from the organic phase by distillation. There remained a mixture of 57.6 grams of dimethyl-phenyl carbinol and 3.52 grams of acetophenone. This corresponded to about 127% and 9%, respectively, of the theoretically possible quantity, based on the hydroperoxide charged.

*Example 2*

The following is an example of the process as applied to the crude mixture obtained by oxidation of cumene. 120 grams of cumene were intimately mixed with oxygen at 105° C. with the addition of 0.3 gram of copper phthalocyanine, until the reaction mixture contained 35% by weight of cumene hydroperoxide which corresponded to a conversion of 30.7%. The formation of by-products such as dimethyl-phenyl carbinol and acetophenone did not occur. The mixture of hydrocarbon and hydroperoxide, was then allowed to drop slowly into 50 grams of 25% sodium hydroxide solution keeping the temperature at 105° C. throughout the addition. The addition required about 1 hour. After complete decomposition of the hydroperoxide, the mixture was worked up in accordance with Example 1. The lye contained 1.0 gram of benzoic acid. After having distilled off the hydrocarbon from the organic phase, there remained a mixture of 52.7 grams of dimethyl-phenyl carbinol and 3.18 grams of acetophenone. This corresponds to about 126% and 9%, respectively, of the theoretically possible amount, based on hydroperoxide charged.

*Example 3* p-Cymene hydroperoxide in amount of 10.9 grams, at 100° C., were allowed to drop into a mixture of 19.2 grams of p-cymene (p-isopropyl toluene) and 10.55 grams of 25% sodium hydroxide solution while vigorously stirring. The temperature of the alkali-cymene emulsion was maintained, throughout the addition at about 105° C. The addition required about 1 hour and 15 minutes. After complete decomposition of the hydroperoxide, the lye was withdrawn. It contained 1.45 grams of toluic acid. The hydrocarbon was distilled off from the organic phase. There remained a mixture of 9.79 grams of dimethyl-p-tolyl carbinol and 0.71 gram of p-methyl acetophenone. This corresponds to about 100% and 8%, respectively of the theoretical amount, based on hydroperoxide charged.

While the invention has been described in detail with reference to certain specific embodiments, various changes and modifications will be apparent to the people skilled in the art, but these embodiments fall within the spirit of the invention and the scope of the appended claims.

We claim:

1. Process for the production of dimethyl phenyl carbinol, which comprises adding cumene hydroperoxide, to about equal parts of a 25% aqueous sodium hydroxide solution at a temperature of 105° C. at a rate sufficient to allow substantially complete conversion into said carbinol and to prevent accumulation of the hydroperoxide in the aqueous medium, and recovering said carbinol formed.

2. Process according to claim 1 wherein cumene hydroperoxide is added to the aqueous alkaline solution previously heated to 105° C.

3. Process according to claim 1 wherein said conversion is effected in the presence of cumene.

4. Process for the production of dimethyl p-tolyl carbinol which comprises adding p-methyl cumene hydroperoxide to about equal parts of a 25% aqueous sodium hydroxide solution at a temperature of 105° C. at a rate sufficient to allow substantially complete conversion into said carbinol and to prevent accumulation of the hydroperoxide in the aqueous medium, and recovering said carbinol formed.

5. Process according to claim 4, wherein said conversion is effected in the presence of p-cymene.

6. Process according to claim 4 wherein p-methyl cumene hydroperoxide is added to the aqueous sodium hydroxide solution previously heated at 105° C.

References Cited in the file of this patent

UNITED STATES PATENTS

| | | |
|---|---|---|
| 2,548,435 | Lorand et al. | Apr. 10, 1951 |
| 2,713,599 | Lorand | July 19, 1955 |
| 2,724,729 | Lorand | Nov. 22, 1955 |
| 2,728,797 | Filar | Dec. 27, 1955 |
| 2,773,906 | Emerson | Dec. 11, 1956 |
| 2,881,220 | Griffin et al. | Apr. 7, 1959 |

OTHER REFERENCES

Milas et al.: "Encyclopedia of Chemical Technology," vol. 10 (1953), page 64 (1 page).

Tobolsky et al.: "Organic Peroxides," pages 120–121 (2 pages), pub. by Interscience Publishers, Inc., New York (1954).